US012741760B2

(12) United States Patent
Wuerl et al.

(10) Patent No.: US 12,741,760 B2
(45) **Date of Patent: *Sep. 22, 2026**

(54) REPEATING GROUND TRACK ORBITS FOR A REUSABLE LAUNCH VEHICLE

(71) Applicant: Blue Origin Manufacturing, LLC, Huntsville, AL (US)

(72) Inventors: Adam Michael Wuerl, Seattle, WA (US); Quinn Robert White Kupec, Renton, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/037,672

(22) Filed: Jan. 27, 2025

(65) Prior Publication Data

US 2025/0171165 A1 May 29, 2025

Related U.S. Application Data

(63) Continuation of application No. 18/179,496, filed on Mar. 7, 2023, now Pat. No. 12,234,039.

(51) Int. Cl.
*B64G 1/64* (2006.01)
*B64G 1/14* (2006.01)

(52) U.S. Cl.
CPC ............... *B64G 1/646* (2013.01); *B64G 1/14* (2013.01)

(58) Field of Classification Search
CPC .................................. B64G 1/14; B64G 1/646
See application file for complete search history.

(56) References Cited

U.S. PATENT DOCUMENTS 4,790,497 A 12/1988 Yoffe
8,074,935 B2 * 12/2011 Gryniewski ............. B64G 5/00 244/172.4
10,843,822 B1 11/2020 Herman et al.

(Continued)

FOREIGN PATENT DOCUMENTS

| | | |
|---|---|---|
| EP | 3786072 | 3/2021 |
| WO | WO0041341 | 7/2000 |
| WO | 2012134929 | 10/2012 |

OTHER PUBLICATIONS

Mahdi Jafari and Nadoushan Nima Assadian, “Repeat ground track orbit design with desired revisit time and optimal tilt”, Aerospace Science and Technology, vol. 40, pp. 200-208, Jan. 2015.

(Continued)

*Primary Examiner* — Justin M Benedik
(74) *Attorney, Agent, or Firm* — Summit Patents, PC

(57) ABSTRACT

Methods for a reusable space vehicle to land at substantially the same location as its launching site. The vehicle traveling in a particular orbit, which is a repeating ground track orbit, allows for launching and landing at the same location once per day. The repeating ground track orbits that allow for launching and landing at the same location once per day overfly the launch and landing site once per day. Launching and landing at the same site provides a number of direct advantages. For example, the just-landed vehicle may be transported a relatively short distance to the launch site, reconditioned relatively quickly, and be ready for a quick turn-around launch.

18 Claims, 4 Drawing Sheets

(56) References Cited

U.S. PATENT DOCUMENTS

| | | | | |
|---|---|---|---|---|
| 2004/0065781 | A1* | 4/2004 | Bingaman | B64G 1/242<br>244/158.4 |
| 2008/0237400 | A1* | 10/2008 | Gryniewski | B64G 1/4024<br>244/172.4 |
| 2020/0198809 | A1* | 6/2020 | Holder | B64G 1/14 |

OTHER PUBLICATIONS

Chauncy Uphoff and Gloria Redden, "Orbit selection for the RadarSat exact repeat groundtrack." Spaceflight mechanics 1992; Proceedings of the 2nd AAS/AIAA Meeting, Colorado Springs, CO, Feb. 24-26, pp. 765-782, 1992. Abstract only.

Dan G. Bellue, Billie F. Boyd, William W. Vaughan, John T. Madura, Tim Garner, Katherine A. Winters, Johnny W. Weems, and Harold C. Herring, "Shuttle Weather Support From Design to Launch to Return to Flight.".

Future Space Transportation Systems Analysis Study. Phase 1 Extension: Transportation Systems Reference Data, vol. 2 Boeing Aerospace Co. Dec. 19, 1975.

Kai Dresia, et al., "Multidisciplinary Design Optimization of Reusable Launch Vehicles for Different Propellants and Objectives." Journal of Spacecraft and Rockets, vol. 58, Jul.-Aug. 2021.¶.

Martin Lara & Ryan p. Russell, "Fast Design of Repeat Ground Track Orbits in High-Fidelity Geopotentials." The Journal of the Astronautical Sciences, vol. 56, 2008, pp. 311-324.

Study of Reentry Vehicle (RV) systems and their associated operations was conducted for the Department of Transportation, https://www.faa.gov/about/office_org/headquarters_offices/ast/media/survey.pdf, accessed on Mar. 25, 2025.

Enrico Tormena, Ana Rita Silva Teixeira, Loïc Brevault, Mathieu Balesdent, Annafederica Urbano. Multidisciplinary design analysis and optimization of launch vehicles including environmental impact. EUCASS 2022—9th European Conference for Aeronautics and Space Sciences, Jun. 2022, Lille, France.

Xiaofeng Fu, Meiping Wu, and Yi Tang, "Design and Maintenance of Low-Earth Repeat-Ground-Track Successive-Coverage Orbits." Journal of Guidance, Control, and Dynamics, vol. 35, Mar. 2012.

"Reusable Launch Vehicle: Technology Development and Test Program", National Research Council. "Reusable Launch Vehicle: Technology Development and Test Program." Washington, DC: The National Academies Press, 1995.

Gurdal , "Repeating Ground Track Design for Low Earth Orbit Satellite", Gurdal, Gurkan. "Repeating Ground Track Design for Low Earth Orbit Satellite." Master of Science, Thesis, Mechanical & Aerospace Engineering, Old Dominion University, 2010.

Vtipil , "Determining an Earth Observation Repeat-Ground-Track Orbit for an Optimization Methodology", Sharon D. Vtipil and Brett Newman, "Determining an Earth Observation Repeat-Ground-Track Orbit for an Optimization Methodology." Journal of Spacecraft and Rockets, vol. 49, Jan.-Feb. 2012.

* cited by examiner

REPEATING GROUND TRACK ORBITS FOR A REUSABLE LAUNCH VEHICLE

CROSS-REFERENCE TO RELATED APPLICATIONS

This application is a Continuation of U.S. application Ser. No. 18/179,496, entitled, "REPEATING GROUND TRACK ORBITS FOR A REUSABLE LAUNCH VEHICLE," filed Mar. 7, 2023, which is incorporated herein by reference in its entirety for all purposes.

BACKGROUND

As is well known, the cost of developing, manufacturing, inspecting, launching, and carrying a payload, such as a satellite, into space is extremely high. These high costs are a function of many factors, such as the extreme complexity and precision of launch vehicles, the high material and labor costs of construction, the difficulty of achieving orbit, and the recurring cost of using one-time-use launch vehicles. These high costs are further exacerbated for space vehicles used for carrying a human crew.

A key variable of design and expense of a space vehicle and its payload is mass. Accordingly, an important parameter of a vehicle and its mission is quantity of propellant that is needed. Though the vast majority of propellant is consumed for launch and entry into a first orbit, each subsequent maneuver, such as for changing orbit altitude, phase, or inclination, for example, further consumes propellant.

Thus, addressing the issues mentioned above may involve, among other things, multi-use launch vehicles that minimize post-target orbit fuel use.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
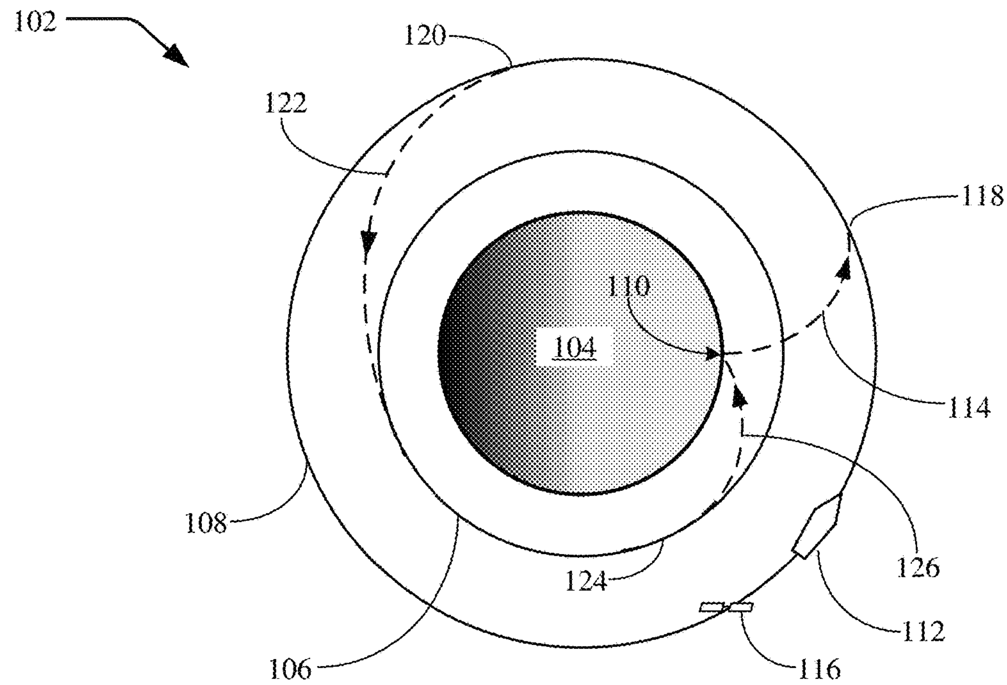
FIG. 1 is a schematic view of the Earth, a repeating ground track orbit, and a target orbit, according to some embodiments.

This disclosure describes processes and methods for, among other things, launching and landing a multi-use space vehicle. In particular, the processes and methods allow for a space vehicle to land at substantially the same location as its launching site. Herein, in this context, "substantially the same" means that the distance between the landing site and the launching site may be from zero to several or tens of kilometers apart. Such a separation distance may be by design or by errors or conditions that act within design tolerances. Launching and landing a spacecraft at substantially the same location can be contrasted with general situations wherein a space vehicle's landing site is not connected or associated with its launch site and the two sites may be thousands of kilometers apart. Hereinafter, for convenience, the word "substantially" will not always be used in this context (e.g., landing at the same location as the launching site), but one is to understand that it applies.

Launching and landing at the same site provides a number of direct advantages. For example, the just-landed vehicle may be transported a relatively short distance to the launch site, reconditioned relatively quickly, and be ready for a quick turn-around launch. Besides these time advantages, there may be a large cost savings by not needing to transport a space vehicle a relatively large distance (back) to a launch site. Less obvious advantages to landing at the launch site arise from characteristics of the particular orbit that is used in the processes and methods for launching and landing a space vehicle at the same site. For example, as explained in detail below, the particular orbit provides contingency landing opportunities once per day. In another example, a space vehicle in the particular orbit allows for fast rendezvous (e.g., a rendezvous that occurs on a time scale of hours rather than days) opportunities once per day with a chaser vehicle launched from earth (e.g., such as for refueling, repairs, life support, rescue, and so on).

The particular orbit mentioned above, which allows for launching and landing at the same location once per day, is a repeating ground track (RGT) orbit. In embodiments described herein, the repeating ground track orbits that allow for launching and landing at the same location once per day, overfly the launch and landing site once per day. In some alternative embodiments, the RGT orbit enables landing opportunities at the specified landing site at different frequencies, such as fewer than once per day to two or more times within a given 24-hour window. For example, once every 18 hours or once every 28 hours. In another alternative embodiment, the RGT orbit provides landing opportunities at two or more landing sites at specified frequencies, such as once per day, where there is a pattern across one or more days of repeated opportunities to land at the various landing sites.

In some embodiments, the processes and methods for launching and landing a multi-use space vehicle at substantially the same location include launching from the launch site on earth to a target orbit, which may be an orbit in which a satellite, for example, is to be placed by the multi-use space vehicle. From launch, inserting the vehicle into the target orbit will generally require one or more maneuvers.

While in the target orbit, the vehicle may perform a number of tasks. Such tasks may be the sole reason for the vehicle's launch in the first place. Upon completion of such tasks, during which the vehicle may orbit a number of times (or may orbit less than one time in some implementations) in the target orbit, the vehicle may maneuver to an RGT orbit, as explained in detail below. After being in the RGT orbit, the vehicle may maneuver to deorbit from the RGT orbit and land substantially at the launch site. With the RGT orbit establishing a pattern for when the vehicle will be tracking towards the desired landing location that is substantially at the launch site, cross-range requirements for guiding the vehicle to such a relatively precise landing are reduced, preserving vehicle launch performance while resulting in mass and cost savings. Typically, large aerodynamic surfaces or additional propellant would be required to enable a precise landing, which affect performance via additional weight and/or aerodynamic drag during launch operations. The repeatable nature of this pattern establishes predictable, repeatable reentry flight corridors for target landing sites that can help streamline regulatory reviews and reduce operational costs.

In some embodiments, a method of launching and landing a multi-use space vehicle includes initial steps of identifying a target orbit and a launch site. For example, the target orbit may be an orbit where the space vehicle is to release a satellite. In another example, the target orbit may be the orbit of another space vehicle (or space station) with which the multi-use space vehicle is to rendezvous. The launch site may be a location or facility configured to launch the space vehicle and to accommodate its landing. For example, the launch site may include a launch pad and a landing strip or landing pad some relatively short distance away from the launch pad. In some implementations, the launch pad may be the same as the landing pad.

The method of launching and landing the multi-use space vehicle further includes calculating maneuvers for transitioning from the target orbit to an RGT orbit. As explained above, the RGT orbit allows for vehicle launching and landing at the same location once per day and overlays the launch and landing site once per day. Generally, in some implementations, the target orbit is the "working" orbit and the RGT orbit provides a once per day opportunity for the vehicle to return to earth.

Calculating maneuvers for transitioning from the target orbit to an RGT orbit involves, for example, orbital dynamics based at least in part on desired orbit altitudes and constraints of the RGT orbit overlaying the launch and landing site once per day.

The method of launching and landing the multi-use space vehicle may further include monitoring weather for launch and landing conditions to determine a favorable window for launch and landing. In some implementations, the launch and landing both occur within the favorable window, which may be multiple consecutive days. In other words, while favorable weather is obviously desired for launch, favorable weather is also desired for the following several days to allow for landing. However, if the weather during some of these following days prevents a landing, the RGT orbit allows the vehicle to delay and land the next day (e.g., a once per day contingency). In some alternative embodiments, the favorable window may span any number of days, including one single day, with landing opportunities for a given target landing site occurring more than once a day to more than 24 hours apart. In yet another alternative embodiment, a given RGT orbit may include two or more designated landing sites, where each site is monitored for weather and landing conditions. Despite this benefit of choice, a most desirable situation is where the weather is predicted to allow for launching and landing within the foreseeable number of days of the planned vehicle space flight.

FIG. 1 is a schematic view 102 of Earth 104, an RGT orbit 106, and a target orbit 108, according to some embodiments. View 102 illustrates the various processes that may be involved in launching and landing at a same location 110 once per day. A vehicle travelling in RGT orbit 106 will substantially overfly the launch and landing site 110 once per day (e.g., Earth day, 24 hours). In an example sequence of events illustrated in FIG. 1, a vehicle 112 is launched from site 110 to target orbit 108 along a trajectory 114. Target orbit 108 may be an orbit in which a satellite 116, for example, is to be placed by the vehicle. From launch, one or more maneuvers along trajectory 114 insert vehicle 112 into target orbit 108 at or near entry 118. In a particular example, target orbit 108 may be at an inclination in a range between about 20°-60°, though claimed subject matter is not limited in this respect. As illustrated in FIG. 1, the target orbit is higher than the RGT orbit.

While in target orbit 108, in some implementations, vehicle 112 may perform a number of tasks, such as launching satellite 116 into the target orbit, as mentioned above. Upon completion of such tasks, after orbiting a number of times (or after completing less than a complete orbit in some implementations) in target orbit 108, the vehicle may initiate a maneuver at point 120 into RGT orbit 106 along trajectory 122. Parameters for trajectory 122 may be based, at least in part, on the location of launch site 110 and parameters of RGT orbit 106, such that vehicle 112 following the RGT orbit flies substantially over the launch site once per day. Using orbital dynamics in view of the above-mentioned parameters may determine details for the maneuvers, such as the thrust, duration, direction, propellant consumption, and so on. In some implementations, two burns are used to enter into RGT orbit 106 from target orbit 108, along a trajectory 122 (not to scale). In some particular implementations, parameters for the trajectory 122 include a phasing delta-V of less than about 0.12 km/see over two burns. In some alternative embodiments, two or more RGT orbits are determined for vehicle 112, where each RGT orbit may differ in the frequency, timing, or location of designated landing sites. For example, each RGT orbit may include a potential landing substantially at the launch site at different times of day, or different contingency landing sites, or different frequencies for flying substantially over the reentry corridor for one or more designated landing sites. Transferring vehicle 112 from target orbit 108 to any of the RGT orbits may require substantially similar propellant resources. In further alternative embodiments, one RGT orbit is selected for vehicle 112 based on the monitored weather and landing conditions present at one or more of the designated landing sites, such as one substantially at the launch site. This selection may happen on-the-fly while vehicle 112 is in target orbit 108. This approach enables maximum flexibility with respect to landing windows and landing sites without requiring substantial additional aerodynamic control surfaces or propellant mass. With each RGT orbit, vehicle 112 has multiple landing opportunities without expending additional propellant; with multiple RGT orbits to choose from, that flexibility expands.

After a number of orbits in RGT orbit 106, vehicle 112 may maneuver, at point 124 along the RGT orbit, to deorbit from the RGT orbit and land substantially at launch site 110 along a trajectory 126. Before deorbiting, vehicle 112 may orbit Earth a number of times per day. In particular embodiments, vehicle 112 in RGT orbit 106 may orbit Earth 15 or 16 times from a first pass over launch site 110 to a second pass over the launch site. In other words, every 15 or 16 orbits, the vehicle will fly over launch/landing site 110. Additionally, this repetitive flyover occurs once per day (e.g., about every 22 hours in some implementations). This feature provides for a benefit wherein the vehicle has an opportunity (e.g., a "window") once per day to land substantially at the launch site. Thus, for example, if the weather at the landing site is problematic for a landing, the vehicle can abort an upcoming deorbit/landing and postpone for one day. If again the weather is bad the next day, or other situation poses bad landing conditions, the vehicle can again postpone deorbit/landing for another day, and so on. This is in contrast to other orbit situations where a postponed orbit may lead to a delay of days or weeks and possible changes to target landing locations.

For similar reasons based on characteristics of RGT orbit 106, a vehicle in RGT orbit 106 may have a window once per day to receive a chaser vehicle 112 launched from Earth for rendezvous. Such a fast rendezvous opportunity once per day may be important for various operations, such as for refueling, repairs, life support, rescue, and so on.

Figure 2:
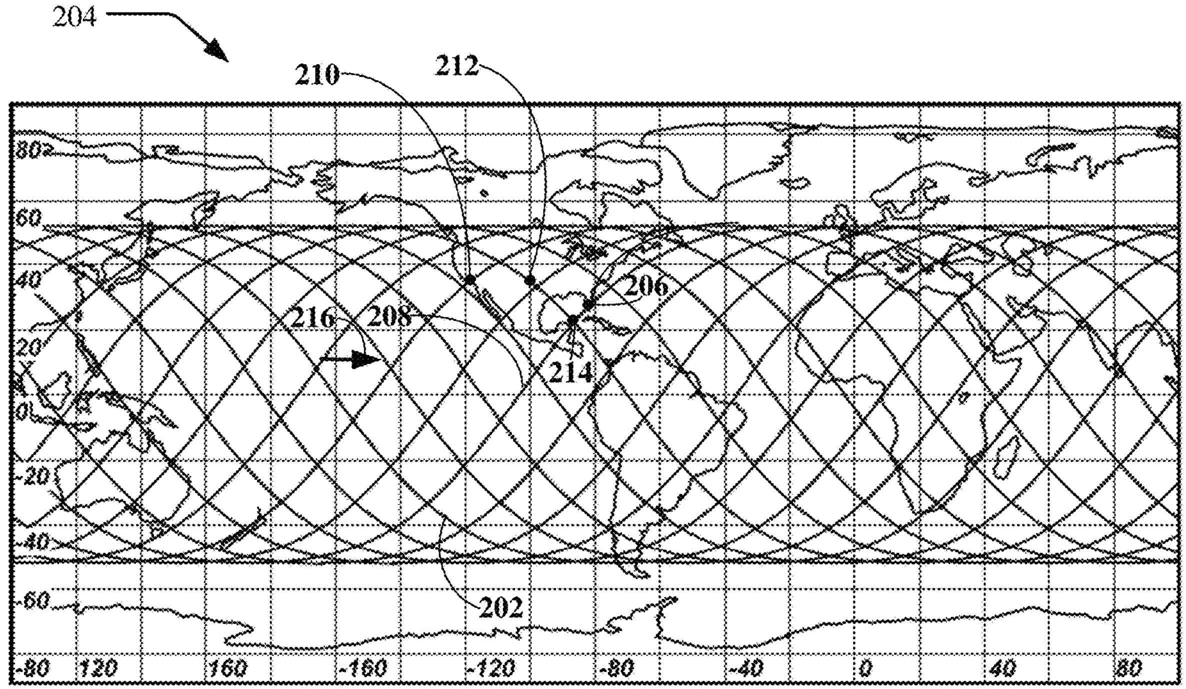
FIG. 2 illustrates ground tracks of a space vehicle in a repeating ground track orbit across the Earth's surface, according to some embodiments.

FIG. 2 illustrates a ground track 202 of a space vehicle in an orbit that repeats once per day. In some implementations, ground track 202 corresponds to about 15 or 16 orbits of the space vehicle per day across Earth's surface 204. A landing site 206 is substantially at the same location as the launch site. As explained above, an RGT orbit, which is represented by ground track 202, allows the vehicle to land as the vehicle approaches the landing site along the ground track, such as along approach 208.

In some implementations, a single RGT orbit may line up over more than one launch/land site at predictable cadences. For example, the RGT orbit represented by ground track 202 may line up with particular launch/land site 210 and 212, and thus allow for launching and landing at each of those sites once per day. In another example, the RGT orbit represented by ground track 202 may also line up with particular launch/land site 214, which is located at an intersection of an ascending (latitude) pass and a descending pass and thus allow for launching and landing at this site twice per day.

In some implementations, a space vehicle may enter an RGT orbit at a particular time to allow for landing at a contingent landing site at a planned time. For example, such a contingent landing site may be selected (e.g., in real-time) if there are problems (e.g., adverse weather, etc.) with a first-choice landing site. Varying the time a space vehicle enters into an RGT orbit, represented by ground track 202 for example, effectively shifts, represented by arrow 216, the ground track, which in turn varies landing sited lined up with the ground track. This shift may be mostly or completely longitudinally directed.

Figure 3:
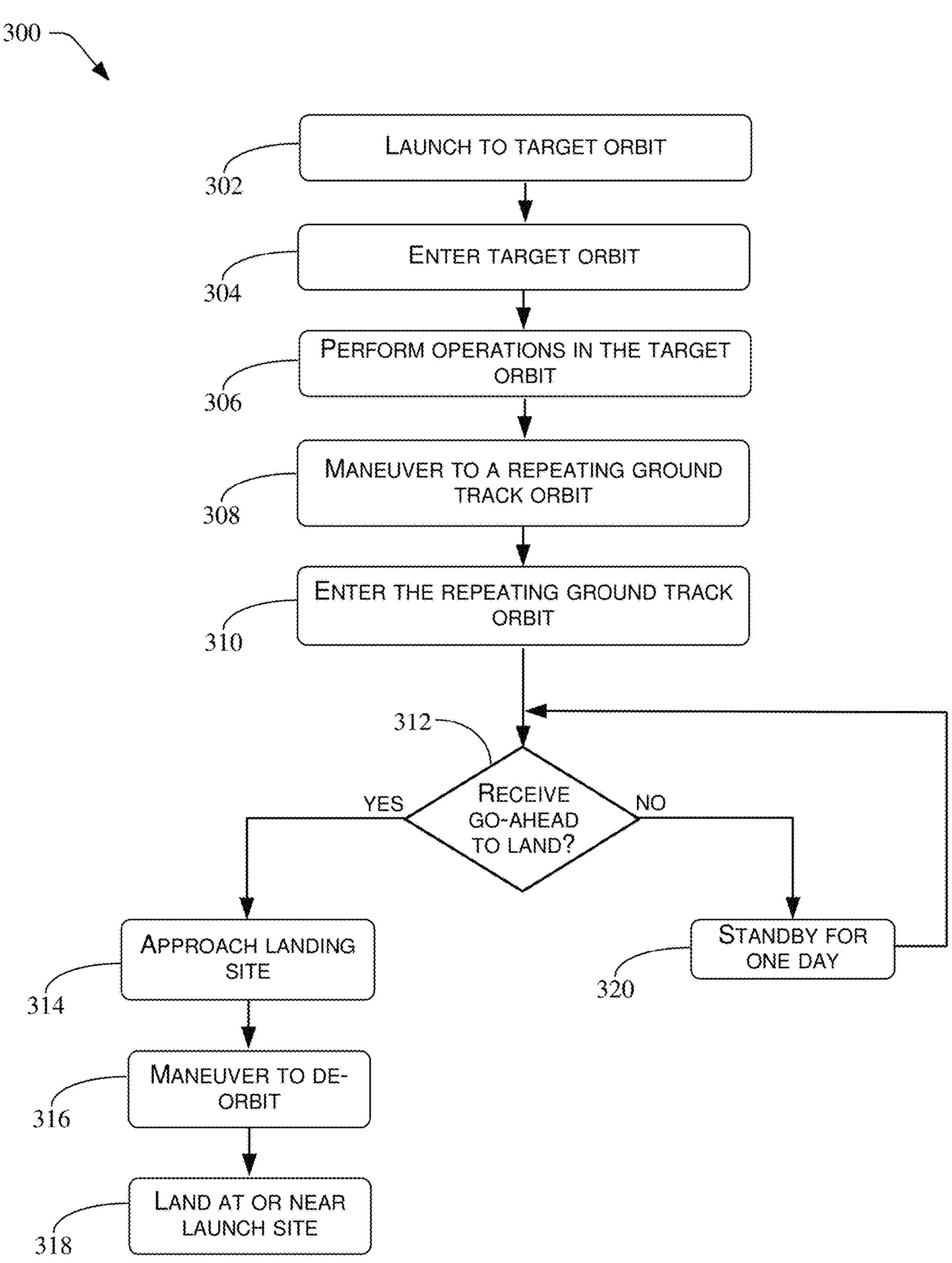
FIG. 3 is a flow diagram of processes involved in launching, operating, and landing a space vehicle, according to some embodiments.

FIG. 3 is a flow diagram of processes 300 involved in launching, operating, and landing a space vehicle, according to some embodiments. At 302, the space vehicle is launched to reach a target orbit. At 304, the vehicle enters the target orbit. At 306, the vehicle performs operations in the target orbit. At 308, the vehicle maneuvers to an RGT orbit. At 310, the vehicle enters the selected RGT orbit. At 312, instructions may be received to proceed to deorbit and land. In this case, at 314, the vehicle approaches the landing site while still in the RGT orbit. The vehicle may traverse a number of orbits before reaching a deorbit approach, such as 208 in FIG. 2. Such a number of orbits would likely be less than 15 or 16, which may be the number of orbits within a full cycle, as explained above. At 316, the vehicle maneuvers to deorbit on during a phase of the RGT orbit that approaches the landing site. At 318, the vehicle lands at or near the landing site. On the other hand, at 312, if the instructions are to not land, then, at 320, the vehicle may delay landing for one day. Process 300 returns to 312 where, if the instructions the next day are again not to land, the vehicle may delay landing for another day. Process 300 again returns to 312 for yet another opportunity to decide whether to land. Each one day delay corresponds to about 15 or 16 additional orbits.

Figure 4:
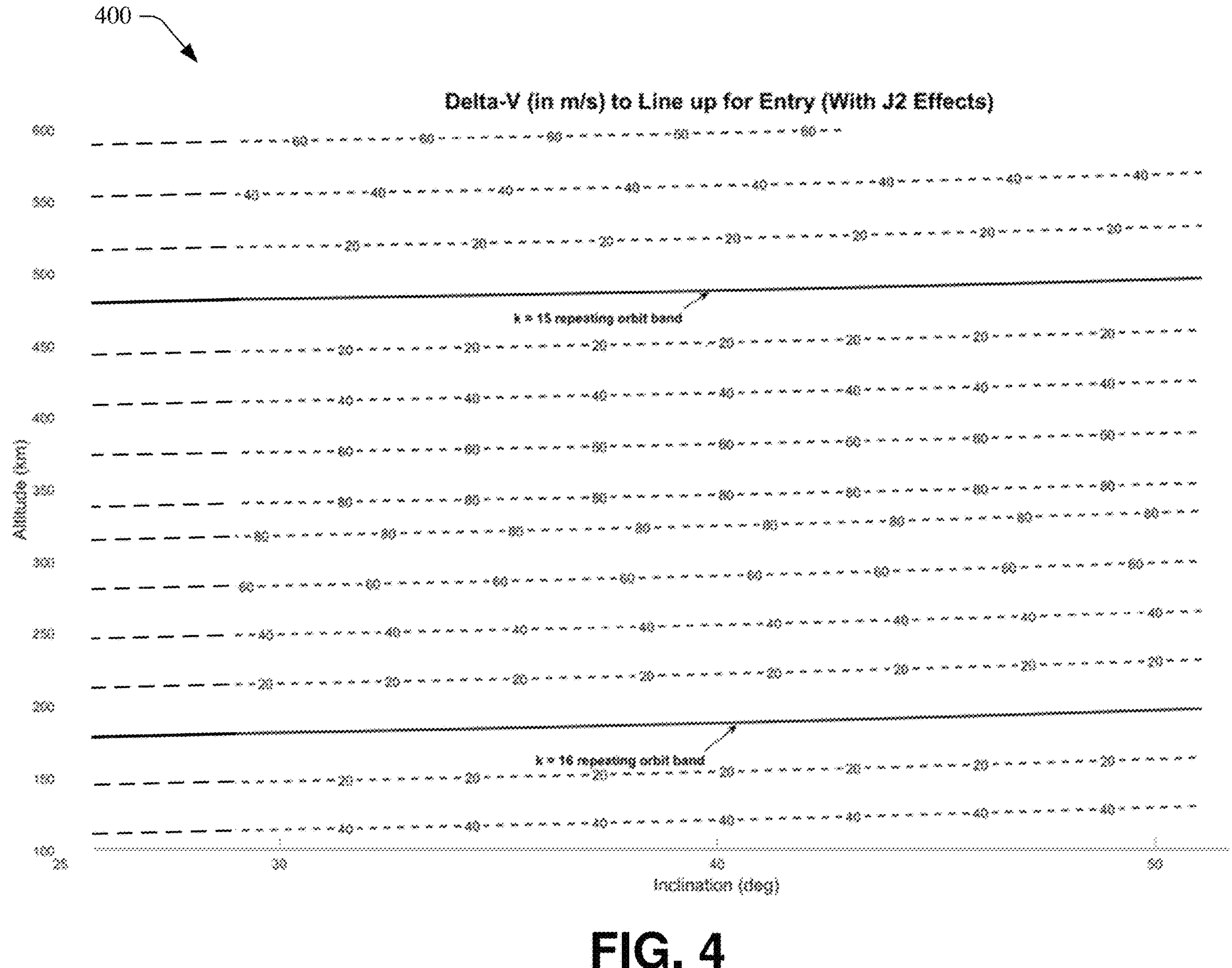
FIG. 4 is a chart of delta-V values for moving to one of two repeating ground track orbits from various altitudes and inclinations, according to some embodiments.

FIG. 4 is a chart 400 of delta-V values for moving to a RGT orbit from various altitudes and inclinations, according to some embodiments. For example, the delta-V values (e.g., velocity-change values in m/s) may be required to move a space vehicle from an arbitrary low Earth orbit into the nearest RGT orbit. The values in chart 400 are merely examples that may be specific to a particular space vehicle, and claimed subject matter is not so limited. As mentioned above, two or more RGT orbits may be determined for a space vehicle, wherein each RGT orbit may differ in the frequency, timing, or location of designated landing sites. Chart 400 illustrates two bands of RGT orbits, which are k=15 and k=16 families of orbits. The k=16 family (e.g., 16 orbits per day) is near 200 km in altitude (the specific altitude generally varies with orbital inclination) and the k=15 family is near 500 km in altitude, for example.

Dashed contours in chart 400 represent the delta-V at a specific altitude/inclination combination needed to move to the nearest RGT orbit. The delta-V values assume a perfect Hohmann transfer between an arbitrary orbit (within the bounds of the chart) and the RGT orbit, though claimed subject matter is not limited in this respect. For example, Hohmann transfers need not be involved in the orbit transfers described herein. Another assumption is that the new RGT orbit has a ground track that passes over the landing site.

Figure 5:
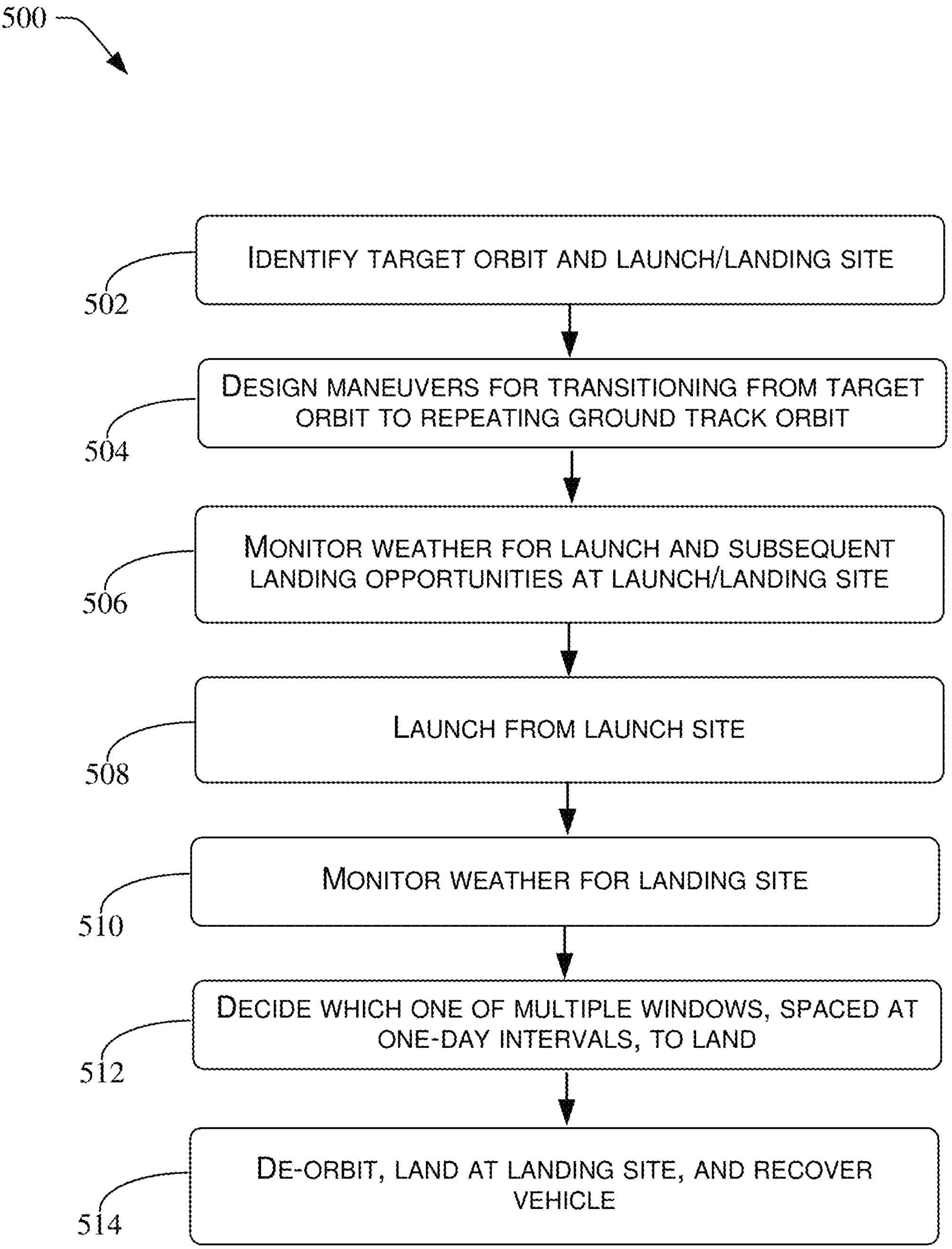
FIG. 5 is a flow diagram of planning a launch and landing of a space vehicle, according to some embodiments.

FIG. 5 is a flow diagram of a process 500 of planning a launch and landing of a space vehicle, according to some embodiments. Process 500 may be performed by an operator, which may be flight administrators, engineers, pilots, or other personnel, for example. In some implementations, process 500 may be autonomous and the operator may be a computer processor.

At 502, the operator may identify a target orbit and a launch/landing site. A selection of a launch/landing site may be based on cost, regulations, infrastructure, and opportunity, just to name a few examples. At 504, the operator may design maneuvers for transitioning from the target orbit to a repeating ground track orbit. For example, a chart similar to or the same as chart 400 may be consulted to determine, in part, dynamics involved in such orbit transitioning. At 506, the operator may monitor weather at the launch/landing site for launch day and several consecutive days thereafter. For example, if a launch mission is expected to last three days, then good weather is desired for those three days or, more particularly, good weather is desired for launch day and the third day. At 508, having good weather and other favorable launch conditions, the operator may launch the space vehicle from the launch site. At 510, the operator may monitor the weather and weather forecasts for the landing site while the space vehicle is in orbit. At 512, while the space vehicle is in the RGT orbit, the operator may decide which one of multiple windows, spaced at one-day intervals, to land. For example, if landing conditions are expected to be unacceptable for landing on one day, then the operator will consider landing on the next day, and so on in daily intervals. Finally, with favorable landing conditions, at 514, the operator may deorbit from the RGT orbit and land at the landing site. The space vehicle may then be prepared for another launch at the launch/landing site. For example, such preparation may involve recovering the vehicle from its landing site, reconditioning the vehicle for another mission, refueling, etc.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

We claim as follows:

1. A method of operating a space vehicle, the method comprising:

launching the space vehicle from a launch site on Earth to a target orbit;

maneuvering the space vehicle from the target orbit to a repeating ground track orbit, wherein the repeating ground track orbit has a defined inclination;

performing propellant transfer operations while the space vehicle is in the repeating ground track orbit, the propellant transfer operations being configured to occur during one or more predetermined windows associated with the repeating ground track orbit;

maneuvering the space vehicle to deorbit from the repeating ground track orbit; and landing the space vehicle at the launch site.

2. The method of claim 1, wherein the repeating ground track orbit comprises an inclination between approximately 28 degrees and 33 degrees.

3. The method of claim 1, wherein the repeating ground track orbit allows the space vehicle to overfly the launch site once per day.

4. The method of claim 1, wherein maneuvering the space vehicle from the target orbit to the repeating ground track orbit comprises performing exactly two thrust operations.

5. The method of claim 1, wherein the repeating ground track orbit provides multiple opportunities for the propellant transfer operations within a 24-hour period.

6. The method of claim 1, wherein the propellant transfer operations involve a rendezvous with an orbiting vehicle launched from Earth.

7. A system for operating a space vehicle, the system comprising:

a propulsion system configured to i) launch the space vehicle from a launch site to a target orbit, and ii) maneuver the space vehicle from the target orbit to a repeating ground track orbit, wherein the repeating ground track orbit lies substantially over the launch site and is configured to periodically overfly the launch site;

a propellant resource to facilitate a refueling operation while the space vehicle is in the repeating ground track orbit, wherein the refueling operation is configured to occur during one or more windows associated with the repeating ground track orbit and includes a rendezvous operation with an orbiting vehicle launched from Earth; and an operator configured to i) initiate deorbiting from the repeating ground track orbit during a phase of the repeating ground track orbit approaching the launch site, and ii) facilitate landing of the space vehicle at the launch site.

8. The system of claim 7, wherein the propulsion system is configured to perform two thrust operations to transition from the target orbit to the repeating ground track orbit.

9. The system of claim 7, wherein the repeating ground track orbit allows the space vehicle to overfly the launch site once per day.

10. The system of claim 7, wherein the repeating ground track orbit provides multiple opportunities for the refueling operation within a 24-hour period.

11. The system of claim 7, wherein the refueling operation is configured to occur during predetermined windows associated with the repeating ground track orbit.

12. A method of operating a space vehicle, the method comprising:

launching the space vehicle from a launch site on Earth to a target orbit;

maneuvering the space vehicle from the target orbit to a repeating ground track orbit, wherein the repeating ground track orbit is configured to provide the space vehicle with a periodic window for landing at the launch site;

maneuvering the space vehicle to deorbit from the repeating ground track orbit; and landing the space vehicle at the launch site.

13. The method of claim 12, wherein the repeating ground track orbit allows the space vehicle to overfly the launch site once per day.

14. The method of claim 12, wherein maneuvering the space vehicle from the target orbit to the repeating ground track orbit comprises performing two thrust operations.

15. The method of claim 12, wherein the repeating ground track orbit provides a window once per day to receive a chaser vehicle launched from Earth.

16. The method of claim 12, wherein the target orbit is at a higher altitude than the repeating ground track orbit.

17. The method of claim 12, wherein the repeating ground track orbit provides a plurality of landing opportunities within a given 24-hour window.

18. The method of claim 12, wherein the repeating ground track orbit comprises an orbital period corresponding to approximately 15 or 16 orbits per day.

* * * * *